United States Patent
Plaja Miro et al.

(10) Patent No.: US 11,199,313 B2
(45) Date of Patent: Dec. 14, 2021

(54) FASTENING SYSTEM FOR FLUSH MOUNTING A DEVICE AND FLUSH-MOUNTABLE DEVICE

(71) Applicant: SIMON S.A., Barcelona (ES)

(72) Inventors: Slavi Plaja Miro, Barcelona (ES); Adria Rique Rebull, Barcelona (ES); Clara Batiste Mayas, Barcelona (ES); Marta Portillo Lainez, Barcelona (ES); Francesc Jordana Casamitjana, Barcelona (ES); Ricard Llimos Sala, Barcelona (ES); Ricard Vila Puig, Barcelona (ES)

(73) Assignee: SIMON S.A., Barcelona (ES)

( * ) Notice: Subject to any disclaimer, the term of this patent is extended or adjusted under 35 U.S.C. 154(b) by 126 days.

(21) Appl. No.: 16/489,635

(22) PCT Filed: Mar. 2, 2018

(86) PCT No.: PCT/ES2018/070154
§ 371 (c)(1),
(2) Date: Aug. 28, 2019

(87) PCT Pub. No.: WO2018/158484
PCT Pub. Date: Sep. 7, 2018

(65) Prior Publication Data
US 2020/0049330 A1  Feb. 13, 2020

(30) Foreign Application Priority Data
Mar. 2, 2017  (EP) .................................... 17382108

(51) Int. Cl.
*F21V 19/00* (2006.01)
*F21V 21/04* (2006.01)
(Continued)

(52) U.S. Cl.
CPC .......... *F21V 19/004* (2013.01); *F21V 21/043* (2013.01); *F16B 2/185* (2013.01);
(Continued)

(58) Field of Classification Search
CPC ...... F21V 19/004; F21V 21/043; F21V 21/03; F21V 21/046; F21V 21/047; F16B 2/185;
(Continued)

(56) References Cited

U.S. PATENT DOCUMENTS 4,048,491 A * 9/1977 Wessman ................ F21V 21/04
362/364
4,274,615 A   6/1981 Kingsley et al.
(Continued)

FOREIGN PATENT DOCUMENTS

EP    045512 A1   4/2009
WO    00/12840 A1  3/2000

OTHER PUBLICATIONS

WIPO, International Search Report, dated Jun. 15, 2018, in International Application No. PCT/ES2018/070154, filed Mar. 2, 2018.
(Continued)

*Primary Examiner* — Laura K Tso
(74) *Attorney, Agent, or Firm* — Thedford I. Hitaffer; Hitaffer & Hitaffer, PLLC

(57) ABSTRACT

The present invention is based on a fastening system for flush mounting a device in a wall and/or ceiling and/or similar through a hole and on the device that comprises the fastening system, wherein said fastening system comprises a gripping means and a securing system. The fastening system enables the device to be flush mounted in a wall and/or ceiling and/or similar through a hole such that the perimeter of the visible face of the device is flush with the wall and/or ceiling and/or similar.

14 Claims, 10 Drawing Sheets

(51) Int. Cl.
*F16B 2/18* (2006.01)
*F21S 8/02* (2006.01)
*F21V 21/03* (2006.01)

(52) U.S. Cl.
CPC .............. *F21S 8/026* (2013.01); *F21V 21/03* (2013.01); *F21V 21/046* (2013.01); *F21V 21/047* (2013.01)

(58) Field of Classification Search
CPC ........ F16S 8/026; F21M 11/041; E04B 9/006; E04B 9/18; F21S 8/026
USPC ....... 362/147, 148, 150, 364, 365, 404, 406; 248/221.11, 343
See application file for complete search history.

(56) References Cited

U.S. PATENT DOCUMENTS

| | | | | |
|---|---|---|---|---|
| 5,964,523 | A * | 10/1999 | Eversberg | F21V 21/04 362/148 |
| 6,241,368 | B1 | 6/2001 | Depino et al. | |
| 6,883,940 | B2 * | 4/2005 | Grajetzky | F21S 8/02 362/148 |
| 6,957,896 | B2 * | 10/2005 | Burgess | F21V 21/04 362/147 |
| 7,172,160 | B2 * | 2/2007 | Piel | F16B 13/0808 248/231.9 |
| 8,827,507 | B2 * | 9/2014 | Van De Ven | F21V 29/70 362/373 |
| 9,052,101 | B1 | 6/2015 | Kathawate et al. | |
| 9,310,036 | B1 | 4/2016 | Kathawate et al. | |
| 2016/0047404 | A1 | 2/2016 | Howard | |

OTHER PUBLICATIONS

WIPO, Written Opinion, dated Jun. 15, 2018, in International Application No. PCT/ES2018/070154, filed Mar. 2, 2018.

* cited by examiner

FIG.3
PRIOR ART
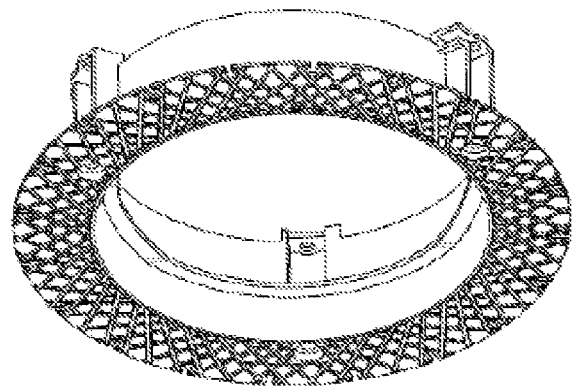
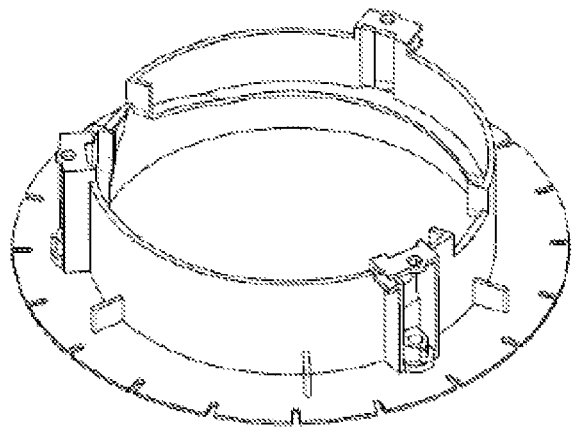

FASTENING SYSTEM FOR FLUSH MOUNTING A DEVICE AND FLUSH-MOUNTABLE DEVICE

CROSS-REFERENCE TO RELATED APPLICATIONS

This application, filed under 35 USC 371, is a United States National Stage Application of International Application No. PCT/ES2018/070154, filed Mar. 2, 2018, which claims priority to EP Application No. 17382108.3, filed on Mar. 2, 2017, the disclosures of which are incorporated herein by reference.

APPLICATION FIELD

The present invention relates to a fastening system for flush mounting a device in a wall and/or ceiling and/or similar mounting structure through a hole in the same, as well as a flush-mountable device to be flush mounted in a wall and/or ceiling and/or similar mounting structure through a hole in the same. The application field of the present invention is the construction/decoration sector and, more specifically, in the installation of devices, preferably electrical or electronic, such as light frames, light fixtures and switches, in a wall and/or ceiling and/or similar mounting structure.

BACKGROUND ART

In the construction/decoration sector, in order to flush mount a device in a wall and/or ceiling and/or similar, there are mainly two fastening systems, depending on the type of device.

The first fastening system for flush mounting a device is shown in FIG. 1 and is used for devices that do not have a perimeter edge. The system comprises at least one hole in one of the sides thereof. This hole is configured so that an L-shaped fitting may be joined to it through the corresponding joining means, which enable the thickness of the wall and/or ceiling and/or similar in which the device must be flush mounted to be delimited.

The main drawback of this system is that the installation thereof is complicated and laborious, especially with regards to fastening the L-shaped fitting that enables the thickness of the wall and/or ceiling and/or similar to be accurately delimited. Furthermore, if the wall must be plastered, an inaccurate fastening of the L-shaped fitting means that an additional amount of plastering is required, causing so-called volcanoing, which consists of a thicker layer of plaster around the hole in which the device is flush mounted but which radially decreases as we move further away from the hole, or the so-called hollowing, in which the thickness of the plaster decreases radially as we move closer to the perimeter of the hole. This new plastering enables imperfections to be hidden but the wall and/or ceiling and/or similar acquires a convex or concave volume, thus causing an unpleasant visual effect.

The second fastening system for flush mounting a device is shown in FIG. 2 and is used for devices that have a perimeter edge. The system comprises an L-shaped fitting that is arranged in cavities of the side region of the device, which are configured to receive this L-shaped fitting. Likewise, due to the configuration of this type of device with a perimeter edge, in order to be able to flush mount the same in the wall and/or ceiling and/or similar, a recess must be made in the wall and/or ceiling and/or similar in order to embed the perimeter edge.

The main drawback of this system is that the L-shaped fittings must be placed with the flush-mounted device already in the wall and/or ceiling and/or similar and this entails a high risk of poor placement or even misplacement thereof.

Likewise, another drawback of this system is the need for a special tool to make the recess in the wall and/or ceiling and/or similar to embed the perimeter edge.

A variant of this second fastening system may be seen in FIG. 3 and consists in that the perimeter edge does not have a constant thickness, but rather it is recessed on the non-visible face thereof, its thickness decreasing as it moves away from the hole. In this way, the edge is in contact with the visible face of the wall, having a minimal thickness that prevents a recess from having to be made in the wall. However, the drawback of this variant is the fact that volcanoing is caused even when it is perfectly mounted.

In addition to these two systems and, particularly, for those devices that comprise a perimeter edge, there is a third fastening system, as disclosed in the patent application with publication number US 2016/0047404 A1.

This fastening system comprises a perimeter edge or frame that is arranged on the visible surface of the wall and/or ceiling and/or similar and a spring assembly made up of a shaft that includes a section with a spring to which a lever is attached, which enables a stop to be moved in terms of height with respect to the perimeter edge or frame so that the thickness of the wall and/or ceiling and/or similar can be delimited and the device can thus be fastened to the same.

This fastening system facilitates the height regulation of the stop to delimit the thickness of the wall and/or ceiling and/or similar, but it shares with the fastening system described above the drawbacks of the edge or frame, which means that a recess must be made in order to embed the perimeter edge or frame and, if it is plastered, the described volcanoing effect will occurs.

Such a drawback is even more pronounced if the device to be flush mounted, once the same is flush mounted in a wall and/or ceiling and/or similar, can be oriented through a shaft. In this case, cracks occur in the plaster around the device as a result of the relative movement of the device with respect to the wall and/or ceiling and/or similar in which it has been flush mounted, the cracks worsening the greater the volcanoing.

Also, documents U.S. Pat. No. 9,310,036 B1 and U.S. Pat. No. 9,052,101 B1 disclose a mounting device for mounting light fixtures into new or existing ceiling mounting openings. The mounting device includes a light fixture coupling element configured to couple to and retain a light fixture, thereby mounting the light fixture to the ceiling and a ceiling coupling mechanism configured to secure the mounting device within the opening in the ceiling. In a mounted condition of the mounting device, the ceiling coupling mechanism is arranged above or in contact with the non-visible face of the ceiling. In consequence, the mentioned ceiling coupling mechanism only prevents movement of the mounting device in axial axis and not in radial or tangential axis.

Lastly, document U.S. Pat. No. 6,241,368 B1 discloses an electrical light fixture assembly for attachment to a mounting panel having a front surface, a back surface and an installation hole formed therethrough. The assembly comprises a housing including a base having a rearwardly facing surface and having at least one knockout disc formed therein and a sidewall extending forwardly of the base to define a hollow enclosure having a front opening. When the housing is inserted into the installation opening, the rearwardly facing surface of the base of the housing is in substantially the same plane as the back surface of the mounting panel. A plurality of tab members extends outwardly from the sidewall, the tab members being adjacent to the front opening of the hollow enclosure and engage the front surface of the mounting panel, thus limiting the entry of the housing through the installation hole of the panel. A stop member is secured to the base for limiting the degree of rotation of an at least one clamp member. A rotatable shaft member, accessible from the front of the housing, rotates the at least one clamp member which is secured to the rotatable shaft member that extends rearwardly of the rearward facing surface of the base. When the rotatable shaft member is rotated, such rotation causes the at least one clamp member to also rotate and thus engage the back surface of the mounting panel, thereby securing the housing to the mounting panel. Then, the electrical light fixture assembly prevents the movement in axial axis but not in radial or tangential axis.

DESCRIPTION OF THE INVENTION

The main purpose of the present invention is to provide a solution to all the aforementioned drawbacks.

To do so, the present invention is based on a fastening system for flush mounting a mountable device in a wall and/or ceiling and/or similar mounting through a hole comprising a gripping means and a securing system. The fastening system enables a mountable device to be flush mounted in a wall and/or ceiling and/or similar mounting structure through a hole such that the perimeter of the visible face of the device is flush in the wall and/or ceiling and/or similar mounting structure such that volcanoing or hollowing is prevented when the wall and/or ceiling and/or similar mounting structure is plastered. The device to be flush mounted may have any shape and size but comprises at least one side region or wall. Preferably, the devices to be flush mounted are electrical or electronic devices with basic geometric shapes, such as light frames, light fixtures, switches, etc.

Likewise, the device to be flush mounted may be configured so that different elements may be connected to it such that the aforementioned device must be flush mounted, in the wall and/or ceiling and/or similar mounting structure, alongside at least one of the elements that may be connected to it. Preferably, the perimeter of the visible face of the at least one of the elements that may be connected to the mountable device does not project from the visible face of the wall and/or ceiling and/or similar mounting structure. Preferably, the visible face of the at least one of the elements that may be connected to the mountable device is sunken with respect to the visible face of the wall and/or ceiling and/or similar mounting structure. Preferably, the element configured to be connected to the mountable device is a frame such that the device, along with the frame, must be flush mounted in the wall and/or ceiling and/or similar mounting structure.

The different elements that may be connected to the mountable device are connected to the same through connection systems known in the state of the art, including snap fitting.

The wall and/or ceiling and/or similar mounting structure is defined by, at least, two surfaces separated by a thickness wherein at least one of them is in contact with the outside, the wall and/or ceiling and/or similar mounting structure comprising a hole sized to receive at least one portion of the mountable device and/or connecting element configured to be connected to the device.

This surface of the wall and/or ceiling and/or similar mounting structure that is in contact with the outside is referred to as the visible face of the wall and/or ceiling and/or similar mounting structure. On the other hand, the surface of the wall and/or ceiling and/or similar mounting structure that is hidden from the outside behind the visible face of the wall and/or ceiling and/or similar mounting structure is referred to as the non-visible face of the wall and/or ceiling and/or similar mounting structure.

Preferably, the hole passes through the entirety of the surfaces and the thickness of the wall and/or ceiling and/or similar mounting structure.

In a flush-mounted condition of the mountable device in the wall and/or ceiling and/or similar mounting structure, the visible faces of the device are defined as the zones of the device that are in contact with the outside. On the other hand, the zones of the device that are hidden from the outside are referred to as non-visible faces of the device in a flush-mounted condition of the device in the wall and/or ceiling and/or similar mounting structure.

Similarly, in a flush-mounted condition of the connecting element configured to be connected to the mountable device in the wall and/or ceiling and/or similar mounting structure, the visible faces of the element are defined as the zones of the element that are in contact with the outside. On the other hand, the non-visible faces of the element configured to be connected to the device are defined as the zones of the element that are hidden from the outside in a flush-mounted condition of the element in the wall and/or ceiling and/or similar mounting structure.

The gripping means is insertable in the vicinity of the perimeter of the hole of the wall and/or ceiling and/or similar mounting structure and is configured to be connected to the mountable device or to at least one connecting element configured to be connected to the mountable device by a first side region of the device or of the connecting element. Preferably, the gripping means is configured to be connected to a first side region of the mountable device or of at least one connecting element in a position close to the visible face of the device or of the connecting element in a flush-mounted condition in the wall and/or ceiling and/or similar mounting structure of the device or of the connecting element.

The securing system comprises a stop means movable through guide means.

Both the gripping means and the securing system are configured to be mechanically connected directly or through the mountable device and/or at least one connecting element configured to be connected to the device such that, in a flush-mounted condition of the device in the wall and/or ceiling and/or similar mounting structure, the stop means is arranged above or in contact with the non-visible face of the wall and/or ceiling and/or similar mounting structure.

This means that the gripping means and the securing system are configured to be joined directly such that the guide means are joined directly to the gripping means, or that the gripping means and the securing system are configured to be joined directly to the mountable device, therefore being connected through the mountable device and/or that the gripping means and the securing system are configured to be joined to at least one connecting element configured to be connected to the mountable device, therefore being connected through the connecting element. Likewise, it would also be possible for the gripping means to be configured to be joined to the mountable device and the securing system configured to be joined to the connecting element or the other way round, that is to say, that the gripping means are configured to be joined to the connecting element and that the securing system is configured to be joined to the mountable device, the gripping means and the securing system thus being connected through the mountable device and the connecting element.

The securing system is joined to the gripping means through joining means known in the state of the art, such as hole and bolt configurations whereby the gripping means has at least one hole or bolt and the securing system comprises a bolt or a hole, respectively.

In a preferred embodiment of the fastening system, the securing system is configured so that the portion that must be joined to the gripping means may be inserted by perforating part of the gripping means.

In another preferred embodiment of the fastening system, the gripping means and/or securing system has a cavity prepared to receive a portion of the securing system and/or gripping means, respectively.

In another preferred embodiment of the fastening system, the securing system is joined to the gripping means through the combination of any of the aforementioned joining techniques.

The gripping means and/or securing system are joined to the mountable device and/or to the connecting element configured to be connected to the mountable device through joining means known in the state of the art, such as hole and bolt configurations such that the gripping means has at least one hole or bolt and the mountable device and the connecting element comprise a bolt or a hole, respectively.

In a preferred embodiment of the fastening system, the gripping means and/or securing system are configured so that the portion that must be joined to the mountable device and/or to the connecting element configured to be connected to the device may be inserted by perforating part of the mountable device and/or connecting element.

In another preferred embodiment of the fastening system, the gripping means and/or securing system have a cavity prepared to receive part of the mountable device and/or of the connecting element configured to be connected to the mountable device.

In another preferred embodiment of the fastening system, the gripping means and/or securing system are joined to the mountable device and/or to the connecting element configured to be connected to the mountable device through the combination of any of the aforementioned joining techniques.

Preferably, the gripping means is inserted in a zone of the thickness of the hole of the wall and/or ceiling and/or similar mounting structure. The gripping means is inserted through the visible face of the wall and/or ceiling and/or similar mounting structure and, preferably, in a flush-mounted condition of the device in the wall and/or ceiling and/or similar mounting structure, the gripping means is embedded in the thickness of the wall and/or ceiling and/or similar mounting structure, more preferably, the gripping means is completely embedded in the thickness of the wall and/or ceiling and/or similar mounting structure.

In a preferred embodiment of the fastening system, the gripping means comprises at least one blade that has a thin laminar body. Preferably, the blade has a thickness of between 0.05 mm and 2.5 mm, more preferably between 0.1 mm and 1.5 mm and more preferably between 0.2 and 0.8 mm. The blade is provided with an insertion edge that is preferably tapered.

In another preferred embodiment of the fastening system, the gripping means comprises a base section from which at least two blades separated from each other project.

Preferably, the aforementioned blades of the gripping means are wedge-shaped.

In a preferred embodiment of the fastening system, the guide means comprise an elongated shaft through which the stop means moves. Preferably, the elongated shaft has at least one threaded portion such that it may rotate with respect to its own axis. Preferably, the stop means moves along the elongated shaft as it makes the same rotate.

In the preferred embodiment of the fastening system wherein the gripping means comprises a base section from which at least two blades separated from each other project, the base section may comprise at least one joining means configured to be joined to the end of the elongated shaft. Preferably, the joining means may comprise at least one hole configured to receive an end of the elongated shaft. In this way, the gripping means and the securing system are also connected to each other through the base section.

In a preferred embodiment of the fastening system, the gripping means is configured to be joined to the mountable device by a first side region of the same in a position close to the visible face of the device in a flush-mounted condition of the device in the wall and/or ceiling and/or similar.

In another preferred embodiment of the fastening system, the gripping means is configured to be joined to at least one connecting element configured to be connected to the mountable device by a first side region of the element in a position close to the visible face of the element in a flush-mounted condition of the element in the wall and/or ceiling and/or similar mounting structure.

In the preferred embodiment of the fastening system, the securing system is configured to be joined to the mountable device by a second side region of the same in a position of the non-visible face of the device in a flush-mounted condition of the element in the wall and/or ceiling and/or similar mounting structure.

In the preferred embodiment of the fastening system wherein the guide means comprise an elongated shaft, the elongated shaft is configured to be joined to the mountable device by the second side region of the device in a position of the non-visible face of the device in a flush-mounted condition of the device in the wall and/or ceiling and/or similar mounting structure.

In a preferred embodiment of the fastening system, the securing system is configured to be joined to the connecting element configured to be connected to the mountable device by a second side region of the element in a position of the non-visible face of the element in a flush-mounted condition of the element in the wall and/or ceiling and/or similar mounting structure.

In the preferred embodiment of the fastening system wherein the guide means comprise an elongated shaft, the elongated shaft may be configured to be joined to the connecting element configured to be connected to the mountable device by the second side region of the element in a position of the non-visible face of the element in a flush-mounted condition of the element in the wall and/or ceiling and/or similar mounting structure.

Preferably, the fastening system is configured to flush mount a device in a wall, ceiling and/or similar mounting structure, formed by at least one laminated plasterboard.

In order to flush mount the device and/or the connecting element configured to be connected to the device in a wall and/or ceiling and/or similar mounting structure, the securing system must first be joined to the gripping means or the fastening system to the device and/or connecting element, such that the gripping means and the securing system are mechanically connected directly or through the device and/or the connecting element.

Next, the gripping means must be inserted in the vicinity of the hole of the wall and/or ceiling and/or similar mounting structure in order to then move the stop means through the guide means until the stop means is arranged above or in contact with the non-visible face of the wall and/or ceiling and/or similar mounting structure.

This means that the gripping means constitutes a first fastening point of the mountable device to the wall and/or ceiling and/or similar mounting structure in which the user wishes to flush mount it. However, in order to facilitate the flush mounting of the device or the connecting element and ensure that they are correctly flush mounted in the wall and/or ceiling and/or similar mounting structure, a second fastening point is required that is achieved with the securing system when, in a flush-mounted condition of the mountable device or the connecting element in the wall and/or ceiling and/or similar mounting structure, the stop means is arranged above or in contact with the non-visible face of the wall and/or ceiling and/or similar mounting structure. With the second fastening point through the stop means, tension is created between the gripping means and the securing system through the guide means and the wall and/or ceiling and/or similar mounting structure such that the gripping means is embedded in the wall and/or ceiling and/or similar mounting structure. Preferably, the perimeter of the visible face of the mountable device and/or connecting element is flush with the visible face of the wall and/or ceiling and/or similar mounting structure. Preferably, the visible face of the connecting element is sunken in the visible face of the wall and/or ceiling and/or similar mounting structure. The object of the present invention is also a flush-mountable device in a wall and/or ceiling and/or similar mounting structure through a hole in the same, which comprises at least one fastening system according to the invention. The fastening system may be prefabricated and may be incorporated into the flush mountable device in the aforementioned manner or the flush mountable device is manufactured already incorporating the fastening system.

Preferably, this mountable device is electrical or electronic, such as light frames, light fixtures, switches, etc.

Likewise, the device to be flush mounted may be configured so that different elements may be connected to it such that the aforementioned device must remain flush mounted in the wall and/or ceiling and/or similar mounting structure with at least one of the elements that may be connected to it. Preferably, the connecting element configured to be connected to the device is a frame such that the device, along with the frame, must be flush mounted in the wall and/or ceiling and/or similar mounting structure.

The different elements that may be connected to the device are connected to the same through connection systems known in the state of the art, including snap fitting.

The fastening system comprises a gripping means and a securing system.

The gripping means is insertable in the vicinity of the perimeter of the hole of the wall and/or ceiling and/or similar mounting structure and is connected to the mountable device or to at least one connecting element connected to the mountable device by a first side region of the same. Preferably, the gripping means is connected to a first side region of the mountable device or of the at least one connecting element connected to the device in a position close to the visible face of the mountable device or of the connecting element connected to the mountable device.

The securing system comprises a stop means movable through guide means.

The gripping means and the securing system are mechanically connected directly or through the mountable device and/or at least one connecting element connected to the mountable device such that, in a flush-mounted condition of the device in the wall and/or ceiling and/or similar mounting structure, the stop means is arranged above or in contact with the non-visible face of the wall and/or ceiling and/or similar mounting structure.

This means that the gripping means and the securing system are joined directly such that the guide means are joined directly to the gripping means, or that the gripping means and the securing system are joined directly to the mountable device, being connected through the mountable device and/or that the gripping means and the securing system are joined to at least one connecting element connected to the mountable device, therefore being connected through the element connected to the mountable device. Likewise, it would also be possible that the gripping means is joined to the device and the securing system to the connecting element connected to the mountable device or the other way round, that is to say, that the gripping means is joined to the connecting element connected to the mountable device and the securing system is joined to the mountable device, the gripping means and the securing system being connected through the mountable device and the connecting element connected to the device.

The securing system is joined to the gripping means through connection or joining systems known in the state of the art and, particularly, any of those explained above.

The gripping means and/or securing system are joined to the mountable device and/or connecting element connected to the device through connection or joining systems known in the state of the art and, particularly, any of those explained above.

Preferably, the gripping means is inserted in the thickness of the wall and/or ceiling and/or similar mounting structure in a zone close to the perimeter of the hole of the wall and/or ceiling and/or similar mounting structure. The gripping means is inserted through the visible face of the wall and/or ceiling and/or similar mounting structure and, preferably, in a flush-mounted condition of the device in the wall and/or ceiling and/or similar mounting structure, the gripping means is embedded in the thickness of the wall and/or ceiling and/or similar, more preferably, the gripping means is completely embedded in the thickness of the wall and/or ceiling and/or similar mounting structure.

In a preferred embodiment of the device, the gripping means comprises at least one blade that has a thin laminar body. Preferably, the blade has a thickness of between 0.05 mm and 2.5 mm, more preferably between 0.1 mm and 1.5 mm and more preferably between 0.2 and 0.8 mm. The blade is provided with an insertion edge that is preferably tapered.

In a preferred embodiment of the device, the gripping means comprises at least two blades that are spaced apart from one another.

Preferably, the blades of the gripping means are wedge-shaped.

Preferably, the tapered edge of the blade is arranged such that, when the fastening system is positioned to flush mount the device in the wall and/or ceiling and/or similar mounting structure, this tapered edge is oriented towards the visible face of the wall and/or ceiling and/or similar mounting structure. In a preferred embodiment of the device, the guide means comprise an elongated shaft through which the stop means moves, such that, in a flush-mounted condition of the device in the wall and/or ceiling and/or similar mounting structure and, the gripping means being inserted in the vicinity of the hole of the wall and/or ceiling and/or similar mounting structure, the elongated shaft is configured to guide the stop means until it is arranged above or in contact with the non-visible face of the wall and/or ceiling and/or similar mounting structure and the gripping means is embedded in a thickness of the wall and/or ceiling and/or similar mounting structure. Preferably, the elongated shaft is configured to rotate about itself and the stop means are connected by means of a thread to the same such that when the elongated shaft rotates, the stop means move along the elongated shaft.

In a preferred embodiment of the device, the gripping means is joined to the device, projecting from a first side region of the device from a position close to the visible face of the device in a flush-mounted condition of the same. In a preferred embodiment of the device, the guide means and, preferably, the elongated shaft in the embodiment in which the guide means comprise an elongated shaft, are joined to the mountable device by a second side region of the same in a position of the non-visible face of the mountable device in a flush-mounted condition of the device in the wall and/or ceiling and/or similar mounting structure.

In a preferred embodiment of the device, the device comprises a perimeter edge from which, in a region close to the visible face of the perimeter edge in a flush-mounted condition of the device, the gripping means projects. Preferably, the perimeter edge is meshed. Preferably, a portion of the guide means is joined to the perimeter edge in a position of the non-visible face of the perimeter edge in a flush-mounted condition of the device.

In another preferred embodiment of the device, the perimeter edge comprises at least one hole, which preferably passes through the thickness of the perimeter edge, which is prepared to receive, preferably to pass therethrough, the securing system, preferably the elongated shaft for an embodiment of the securing system in which the guide means comprise an elongated shaft such that the elongated shaft is joined to the perimeter edge in an through manner, enabling the elongated shaft to rotate about itself. Preferably, the elongated shaft comprises a visible stop that connects to the visible face of the perimeter edge around the hole in a flush mounted configuration of the mountable device in the wall and/or ceiling and/or similar mounting structure.

In another preferred embodiment of the device, the perimeter edge comprises, on the face visible from the inner perimeter thereof, a lip that has at least one surface that is coplanar with a base of the blade, which in a flush-mounted condition of the device in the wall and/or ceiling and/or similar mounting structure, is also coplanar with the visible face of the wall and/or ceiling and/or similar mounting structure. In this preferred embodiment, in which the perimeter edge comprises a lip, in a flush-mounted condition of the mountable device in the wall and/or ceiling and/or similar mounting structure, a space is defined between the wall and/or ceiling and/or similar mounting structure and the lip, this space being configured to receive the plaster in the plastering process such that, in the case where it is necessary to plaster the wall and/or ceiling and/or similar mounting structure, volcanoing does not occur.

It must be noted that the visible face of the perimeter edge is defined as the zones of the perimeter edge that, in a flush-mounted condition of the device in the wall and/or ceiling and/or similar mounting structure, are in contact with the outside. On the other hand, the zones of the perimeter device that, in a flush-mounted condition of the device in the wall and/or ceiling and/or similar mounting structure, are hidden from the outside are referred to as non-visible faces of the perimeter edge.

In a preferred embodiment of the flush-mountable device, the flush-mountable device comprises an element connected to the device; preferably this element is a frame, arranged around at least one portion of the perimeter of the device. Preferably, the element connected to the mountable device is arranged in a side region of the mountable device in a position close to the visible face of the device. Preferably, the gripping means is joined to the frame projecting from a first side region of the frame in a position close to the visible face of the frame in a flush-mounted condition of the frame in the wall and/or ceiling and/or similar mounting structure.

Preferably, the securing system and, more specifically the elongated shaft for the embodiment of the securing system in which the guide means comprise an elongated shaft, is joined to the frame by a second side region of the frame in a position of the non-visible face of the frame in a flush-mounted condition of the device in the wall and/or ceiling and/or similar mounting structure. In this way, the gripping means and the securing system are mechanically connected through the frame and, as a result, through the element connected to the mountable device.

In another preferred embodiment of the device, the device comprises an element connected to the device, preferably a frame, with at least one hole through the thickness thereof, which preferably passes through the thickness of the frame, prepared to receive, preferably to be passed therethrough by, the securing system, preferably the elongated shaft for an embodiment of the securing system in which the guide means comprise an elongated shaft such that the elongated shaft is joined to the frame in a through manner, enabling the elongated shaft to rotate about itself. Preferably, the elongated shaft comprises a visible stop that connects to the visible face of the frame around the hole in a flush-mounted condition of the device in the wall and/or ceiling and/or similar mounting structure.

Preferably, the frame is meshed.

In another preferred embodiment of the device wherein the gripping means comprises a blade, the element connected to the device and, more preferably the frame, comprises, on the face visible from the inner perimeter thereof, a lip, which has at least one surface that is coplanar with a base of the blade, which in a flush-mounted condition of the device in the wall and/or ceiling and/or similar mounting structure, is also coplanar with the visible face of the wall and/or ceiling and/or similar mounting structure, such that, in a flush-mounted condition of the device in the wall and/or ceiling and/or similar mounting structure, a space is defined between the wall and the lip, the space being configured to receive the plaster, in the case that it is necessary to plaster the wall and/or ceiling and/or similar mounting structure. This enables the formation of the volcanoing effect to be avoided in the case where the wall and/or ceiling and/or similar is plastered.

It must be noted that the visible face of the element connected to the device, preferably the frame is defined as the zones of the element that, in a flush-mounted condition of the element in the wall and/or ceiling and/or similar mounting structure, are in contact with the outside. On the other hand, the zones of the element that, in a flush-mounted condition of the device in the wall and/or similar mounting structure, are hidden from the outside are referred to as non-visible faces of the element.

Preferably, the flush mounted device comprises three or more fastening systems that are arranged essentially equidistant to each other.

Preferably, the device with a fastening system is flush mounted in a wall, ceiling and/or similar mounting structure, formed by at least one laminated plasterboard.

In order to flush mount the device, or the device with the element connected to the device, the user must position the gripping means in the vicinity of the hole of the wall and/or ceiling and/or similar mounting structure, in order to then move the stop means through the guide means until the gripping means is embedded in the wall and/or ceiling and/or similar mounting structure and the stop means is arranged above or in contact with the non-visible face of the wall and/or ceiling and/or similar mounting structure.

BRIEF DESCRIPTION OF THE DRAWINGS

The previous advantages and characteristics, in addition to others, shall be understood more fully in light of the following detailed description of exemplary embodiments, with reference to the drawings attached, which must be taken by way of illustration and not limitation, wherein:

FIG. 3 shows a schematic view of another fastening system for flush mounting devices of the prior art;

DETAILED DESCRIPTION OF AN EXEMPLARY EMBODIMENT

Figure 1:
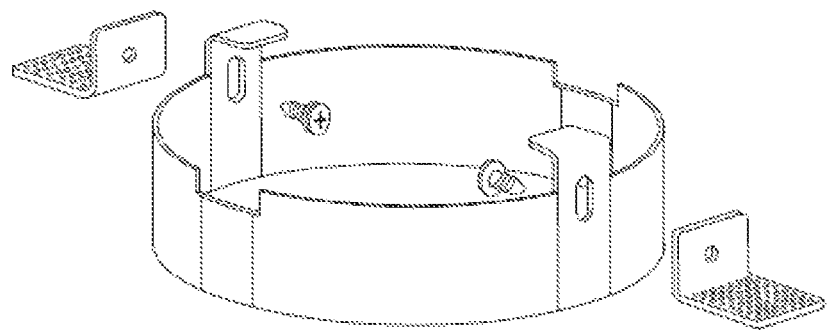
FIG. 1 shows a schematic view of a fastening system for flush mounting devices of the prior art.
Figure 2:
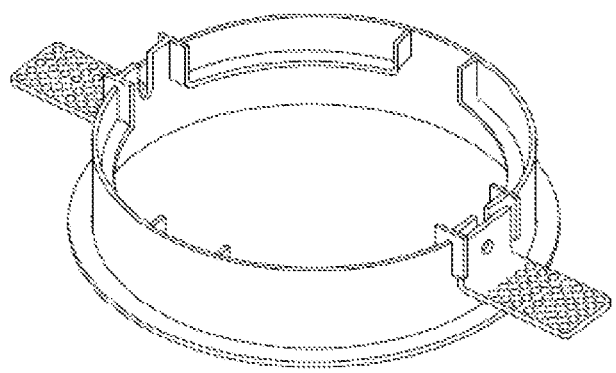
FIG. 2 shows a schematic view of another fastening system for flush mounting devices of the prior art.
Figure 4:
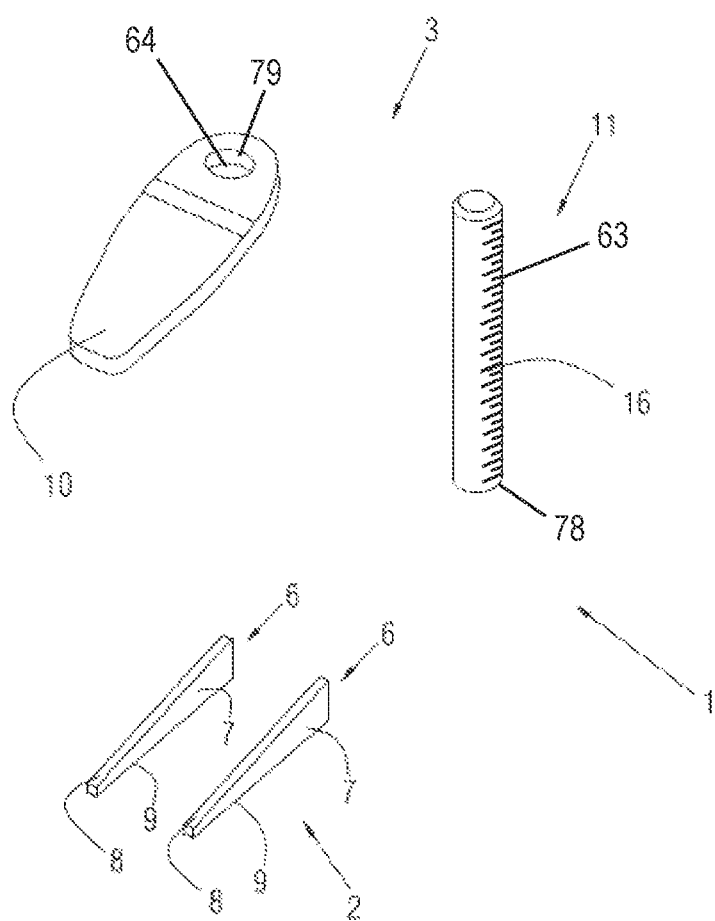
FIG. 4 shows a schematic view of a preferred embodiment of a fastening system for flush mounting devices according to the invention.

FIG. 4 shows a view of a preferred embodiment of the fastening system (1) according to the invention for flush mounting a device (4) in a wall and/or ceiling and/or similar mounting structure (12) through a hole (13) in the mounting structure (12) (shown, for example, in FIG. 7), which comprises a gripping means (2) and a securing system (3).

The device (4) to be flush mounted may have any shape and/or size and may be configured so that an element (5) (shown, for example, in FIG. 5) may be connected to it.

Figure 7:
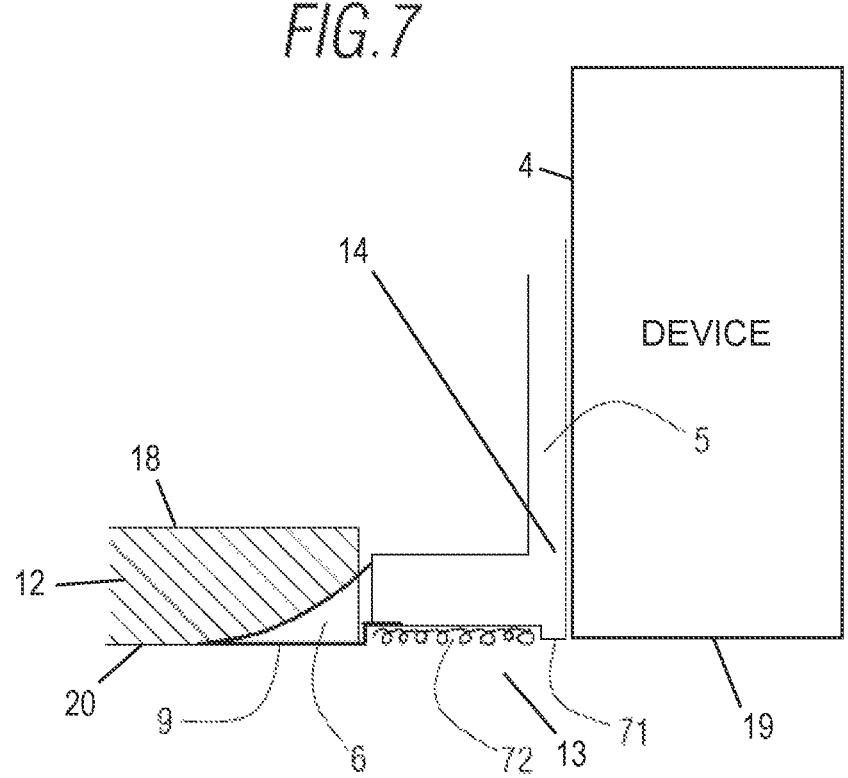
FIG. 7 shows a transverse cross section of an element configured to be connected to the device, flush mounted in a wall and/or ceiling and/or similar mounting structure.

The gripping means (2) is insertable in the vicinity of the perimeter of the hole (13) of the wall and/or ceiling and/or similar mounting structure (12) and is configured to be connected to the mountable device (4) (shown, for example, in FIG. 8) or to at least one connecting element (5) configured to be connected to the device (4) by a first side region (14) of the device (4) (shown, for example in FIG. 7).

The securing system (3) comprises a stop means (10) movable through guide means (11), the securing system (3) being configured so that, in a flush-mounted condition of the mountable device (4) in the wall and/or ceiling and/or similar mounting structure (12), the stop means (10) is arranged above or in contact with the non-visible face (18) (shown, for example, in FIGS. 7 and 10) of the wall and/or ceiling and/or similar mounting structure (12).

The gripping means (2) and the securing system (3) are configured to be mechanically connected through the mountable device (4) and/or to at least one connecting element (5) connected to the device (4).

This means that the gripping means (2) and the securing system (3) are configured to be joined to the mountable device (4) and/or to at least one connecting element (5) configured to be connected to the device (4).

In this preferred embodiment, the gripping means (2) comprises two blades (6) that have a thin laminar body (7) and which are configured to be joined to the mountable device (4) and/or at least one connecting element (5) connected to the device (4) such that a base (9) of the blade (6) is essentially coplanar with the plane defined by the perimeter of the visible face (19) (shown, for example, in FIGS. 7 and 10) of the device (4) in a flush-mounted condition of the same in the wall and/or ceiling and/or similar mounting structure (12) and, preferably, the base (9) of the blades (6) are also coplanar with the visible face (20) of the wall and/or ceiling and/or similar mounting structure (12).

In this preferred embodiment, the guide means (11) comprise an elongated shaft (16) configured to be joined to the mountable device (4) and/or at least one connecting element (5) configured to be connected to the device (4).

In order to flush mount the device (4) and/or the connecting element (5) in a wall and/or ceiling and/or similar mounting structure (12), the user must first join the fastening system (1) according to the invention to the mountable device (4) and/or to the connecting element (5), such that the gripping means (2) and the securing system (3) are mechanically connected and through the mountable device (4) and/or connecting element (5).

The gripping means (2) must then be inserted, through an insertion edge (8) of the blades (6) thereof, in the vicinity of the hole (13) of the wall and/or ceiling and/or similar mounting structure (12) in order to then move the stop means (10) through the guide means (11) until the stop means (10) is arranged above or in contact with the non-visible face (18) of the wall and/or ceiling and/or similar mounting structure (12) and the blades (6) of the gripping means (2) are embedded in the wall and/or ceiling and/or similar mounting structure (12).

Figure 5:
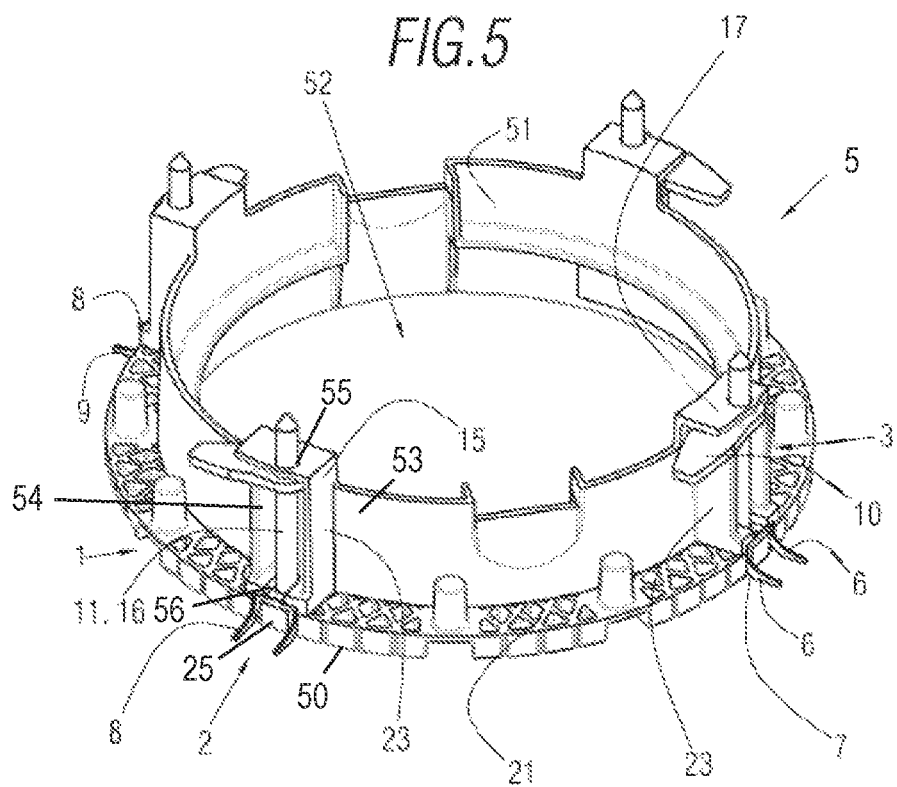
FIG. 5 shows a schematic view of a preferred embodiment of a fastening system for flush mounting devices according to the invention wherein the gripping means and the securing system are joined to an element configured to be connected to the device.

FIG. 5 shows a schematic view of a preferred embodiment of a fastening system (1) for flush mounting devices (4) according to the invention wherein the gripping means (2) and the securing system (3) are joined to a connecting element (5) configured to be connected to the device (4).

In this case, the mountable device (4) has a cylindrical shape and the connecting element (5) configured to be connected to the device (4) has a cylindrical-shaped ring section (51) and a perimeter edge (21) such that the hole (52) defined by the ring section (51) is prepared to receive the device (4).

The gripping means (2) comprises two blades (6) joined to a first side region (25) of the connecting element, and, more specifically, to the perimeter edge (21) that have a thin laminar body (7), provided with an insertion edge (8), which is preferably sharp, such that a base (9) of the blades (6) is essentially coplanar with the visible face (20) of the wall and/or ceiling and/or similar mounting structure (12) (shown, for example, in FIGS. 7 and 10) in a flush-mounted condition of the connecting element (5) in the wall and/or ceiling and/or similar mounting structure (12), and is also coplanar with the plane defined by the perimeter of the visible face (19) of the mountable device (4) (shown in FIG. 7) in a condition wherein the device (4) is joined to the connecting element (5) and is flush mounted in the wall and/or ceiling and/or similar mounting structure (12).

The securing system (3) comprises a stop means (10) and guide means (11) that comprise an elongated shaft (16). The securing system (3) is joined to the connecting element (5) configured to be connected to the mountable device (4) through a structure (15) with a rectangular vertical cross section joined to the ring section (51) and to the perimeter edge (21).

Specifically, the structure (15) comprises an upper cover (17), joined to a portion of the ring section (51) far from the visible face (50) of the element (5) in a flush-mounted condition of the connecting element (5) in the wall and/or ceiling and/or similar mounting structure (12), and side walls (23), joined to the side surface (53) of the ring section (51) and to the perimeter edge (21), the upper cover (17) and the side walls (23) defining a cavity (54) towards the outside of the ring section (51) such that within the cavity (54) are located the elongated shaft (16) and the stop means (10), which is a tab joined in a through manner to the elongated shaft (16) such that it enables the elongated shaft (16) to rotate about itself. The elongated shaft (16) is joined in a through manner by one of the ends thereof to the upper cover (17) and by the other to the perimeter edge (21), thus enabling the elongated shaft (16) to rotate about itself.

More specifically, the elongated shaft (16) passes through a hole (55) of the upper cover (17) and a hole (56) of the perimeter edge (21), this end that passes through the hole (56) of the perimeter edge (21) comprising a visible stop (78) that connects to the visible face (50) of the connecting element (5) in a flush-mounted condition of the mountable device (4) in the wall and/or ceiling and/or similar mounting structure (12). This visible stop (78) has at least a notch that enables the elongated shaft (16) to rotate through an outside tool. Specifically, the connecting element (5), around the hole (56) of the perimeter edge (21) that the elongated shaft (16) passes through, has a receptacle in which the visible stop (78) fits such that it does not project beyond the plane that contains the visible face (50) of the connecting element (5) in a flush-mounted condition of the connecting element (5) in the wall and/or ceiling and/or similar mounting structure (12).

Figure 6:
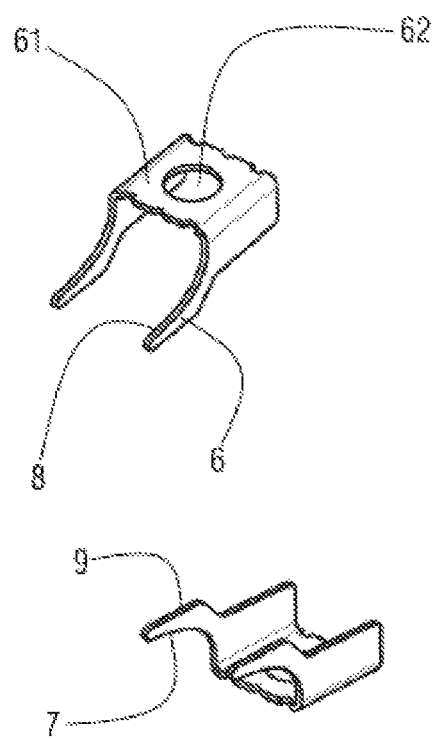
FIG. 6 shows a schematic view of a preferred embodiment of the gripping means of a fastening system according to the invention.

The gripping means (2), as may be seen in FIG. 6, further comprises a base section (61) wherein the two blades (6) are arranged at the opposite ends of the base section (61) such that the blades (6) are joined to the base section (61) by an end opposite to that of the base (9) of the blade (6), the insertion edge (8) being a continuation of the base section (61) of the gripping means (2). In this preferred embodiment, the base section (61) of the gripping means (2) comprises a hole (62), the base section (61) being inserted in the perimeter edge (21) such that the hole (62) thereof coincides with that of the perimeter edge (21) and the elongated shaft (16) therefore also passes through it.

The elongated shaft (16) comprises a threaded portion or surface (63) (shown in FIG. 4) and the stop means (10) comprises a hole (64) in the surface of which there is at least a notch. The elongated shaft (16) passes through the hole (64) of the stop means (10) such that it enables the relative movement of the stop means (10) along the elongated shaft (16) as the latter rotates about its own axis.

The stop means (10) is movable along at least one portion of the elongated shaft (16) such that, in a flush-mounted condition of the connecting element (5) configured to be connected to the mountable device (4) in the wall and/or ceiling and/or similar mounting structure (12), the stop means (10) is arranged above or in contact with the non-visible face (18) of the wall and/or ceiling and/or similar mounting structure (12) and the blades (6) are embedded in the wall and/or ceiling and/or similar mounting structure (12).

As a result, the gripping means (2) and the securing system (3) are also connected to each other through the connecting element (5) configured to be connected to the mountable device (4) as they are both joined to the element (5) and also through the wall and/or ceiling and/or similar mounting structure (12) in a flush-mounted condition of the connecting element (5).

In order to flush mount the device (4), the connecting element (5) configured to be connected to the device (4) is first installed in the wall and/or ceiling and/or similar mounting structure (12).

Then, the gripping means (2) must be positioned in the vicinity of the hole (13) of the wall and/or ceiling and/or similar mounting structure (12) in order to then move the stop means (10) through the guide means (11) until the stop means (10) is arranged above or in contact with the non-visible face (18) of the wall and/or ceiling and/or similar mounting structure (12). While the stop means (10) is moved, the blades (6) of the gripping means (2) are embedded through the visible face (20) of the wall and/or ceiling and/or similar mounting structure (12) in the vicinity of the hole (13) of the same until they are completely embedded in the thickness of the wall and/or ceiling and/or similar mounting structure (12), preferably until the perimeter edge (21) of the connecting element (5) is sunken in the thickness of the wall and/or ceiling and/or similar mounting structure (12) with respect to the visible face (20) thereof.

Lastly, the mountable device (4) is connected to the connecting element (5) configured to be connected to the device (4), the visible face (19) of the device (4) preferably being flush with the visible face (20) of the wall and/or ceiling and/or similar mounting structure (12).

In a preferred embodiment of the connecting element (5) configured to be connected to the mountable device (4) wherein the gripping means (2) comprises at least one blade (6), the perimeter edge (21) comprises on a visible face on the inner perimeter thereof, a lip (71), as may be seen in FIG. 7, which has at least one surface that is coplanar with a base (9) of the blade (6), which in a flush-mounted condition of the connecting element (5) in the wall and/or ceiling and/or similar mounting structure (12) is also coplanar with the visible face (20) of the wall and/or ceiling and/or similar mounting structure (12), such that, in a flush-mounted condition of the device (4) in the wall and/or ceiling and/or similar mounting structure (12), a space (72) is defined between the wall and/or ceiling and/or similar mounting structure (12) and the lip (71), the space (72) being configured to receive plaster, in the case that it is necessary to plaster the wall and/or ceiling and/or similar mounting structure (12).

Figure 8:
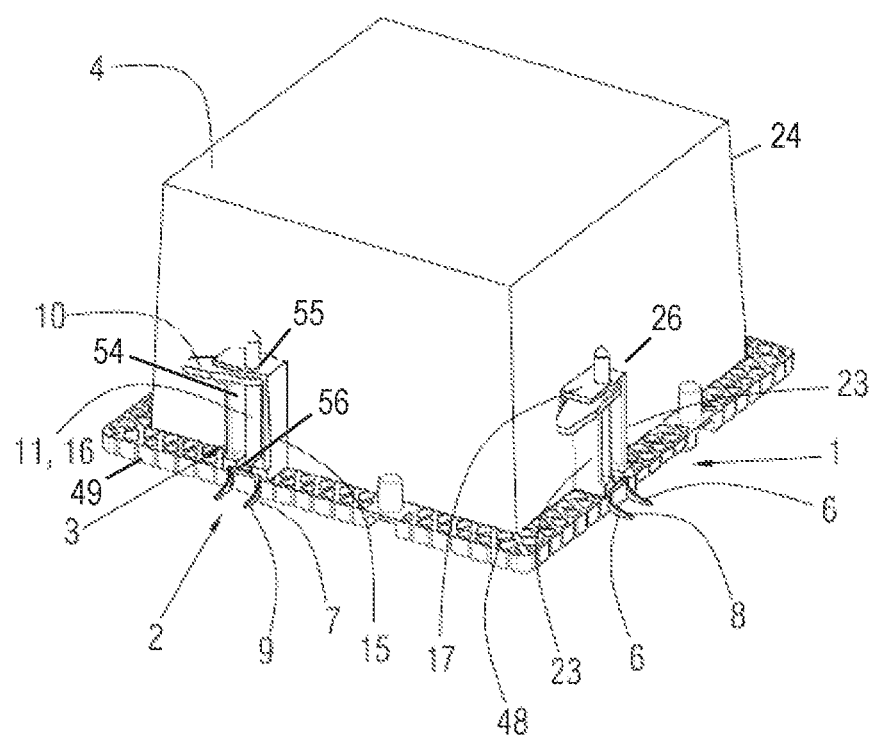
FIG. 8 shows a schematic view of a preferred embodiment of a fastening system for flush mounting devices according to the invention wherein the gripping means and the securing system are joined to the mountable device.

FIG. 8 shows a schematic view of a preferred embodiment of a fastening system (1) for flush mounting devices according to the invention wherein the gripping means (2) and the securing system (3) are joined to the mountable device (4).

In this case, the mountable device (4), which comprises a perimeter edge (48), is prism shaped from which at least one structure (15) prepared to receive the securing system (3) projects.

The gripping means (2) comprises two blades (6), joined in a side region of the mountable device (4) comprising a perimeter edge (48), close to the visible face (49) of the perimeter edge (48) in a flush mounted configuration of the device (4) in the wall and/or ceiling and/or similar mounting structure (12), which have a thin laminar body (7) provided with a base (9) that is essentially coplanar with the plane defined by the perimeter of the visible face (19) of the device (4) in a flush-mounted condition of the device (4) in the wall and/or ceiling and/or similar mounting structure (12). In a preferred embodiment of the fastening system (1), the blades (6) have a thickness between 0.2 and 0.8 mm. The blades (6) comprise an insertion edge (8) which, in a flush-mounted condition of the device (4) in the wall and/or ceiling and/or similar mounting structure (12), is oriented towards the visible face (20) of the wall and/or ceiling and/or similar mounting structure (12). Preferably, the insertion edge (8) is sharp.

The securing system (3) comprises a stop means (10) and guide means (11) that comprise an elongated shaft (16) that is joined to a second side region (26) of the mountable device (4) in a position close to the visible face (19) of the device (4) in a flush mounted configuration of the device (4) in the wall and/or ceiling and/or similar mounting structure (12).

Specifically, the structure (15) comprises an upper cover (17), which projects from a portion of the mountable device (4) far from the visible face (19) of the device (4) in a flush-mounted condition of the device (4) in the wall and/or ceiling and/or similar mounting structure (12), and two side walls (23), which project from a side wall (24) of the device (4) and they are joined to the perimeter edge (48), this upper cover (17) and the side walls (23) defining a cavity (54) prepared to receive the elongated shaft (16) and the stop means (10) that is a tab joined to the elongated shaft (16) by means of a through join (79) that enables the elongated shaft (16) to rotate. The elongated shaft (16) is joined by means of a through join (79) by one of the ends thereof to the upper cover (17) and by the other to the perimeter edge (48), thus enabling the elongated shaft (16) to rotate about itself.

More specifically, the elongated shaft (16) passes through a hole (55) of the upper cover (17) and a hole (56) of the perimeter edge (48), this end that passes through the hole (56) of the perimeter edge (48) comprising a visible stop (78) that connects to the visible face (49) of the perimeter edge (48) in a flush-mounted condition of the device (4) in the wall and/or ceiling and/or similar mounting structure (12). This visible stop (78) has at least a notch that enables the elongated shaft (16) to rotate through an outside tool. Specifically, the area of the perimeter edge (48) around the hole (56) that the elongated shaft (16) passes through, has a receptacle in which the visible stop (78) fits such that it does not project beyond the plane that contains the visible face (49) of the perimeter edge (48) in a flush-mounted condition of the device (4) in the wall and/or ceiling and/or similar mounting structure (12).

The gripping means (2) further comprises a base section (61) wherein the two blades (6) are arranged at the opposite ends of the base section (61) such that the blades (6) are joined to the base section (61) by an end opposite to that of the base (9) of the blade (6), the insertion edge (8) being a continuation of the base section (61) of the gripping means (2). In this embodiment, the base section (61) of the gripping means (2) comprises a hole (62) and it is inserted in a region of the perimeter edge (48) to which one of the ends of the elongated shaft (16) is joined such that the hole (62) thereof coincides with that of the perimeter edge (48) and the elongated shaft (16) therefore also passes through it.

The elongated shaft (16) comprises a threaded portion or surface (63) (shown in FIG. 4) and the stop means (10) comprises a hole (64) in the surface of which there is at least a notch. The elongated shaft (16) passes through the hole (64) of the stop means (10) such that it enables the relative movement of the stop means (10) along the elongated shaft (16) as the latter rotates about its own axis.

The stop means (10) is movable along at least one portion of the elongated shaft (16) such that, in a flush-mounted condition of the device (4) in the wall and/or ceiling and/or similar mounting structure (12), the stop means (10) is arranged above or in contact with the non-visible face (18) of the wall and/or ceiling and/or similar mounting structure (12) and the blades (6) are embedded in the wall and/or ceiling and/or similar mounting structure (12).

As a result, the gripping means (2) and the securing system (3) are connected to each other through the mountable device (4) as they are both joined to the device (4).

In order to flush mount the device (4), the user must position the gripping means (2) in the vicinity of the hole (13) of the wall and/or ceiling and/or similar mounting structure (12) in order to then move the stop means (10) through the guide means (11), making these guide means (11) rotate until the stop means (10) is arranged above or in contact with the non-visible face (18) of the wall and/or ceiling and/or similar mounting structure (12) and the blades (6) of the gripping means (2) are embedded in the wall and/or ceiling and/or similar mounting structure (12) as they are embedded in the same through the visible face thereof.

In a preferred embodiment of the mountable device (4), the perimeter edge (48) of the device (4) comprises on the visible face (49) on the inner perimeter thereof, a lip (71), which has at least one surface that is coplanar with the base (9) of the blade (6), which in a flush mounted configuration of the device (4) in the wall and/or ceiling and/or similar mounting structure (12) is also coplanar with the visible face (20) of the wall and/or ceiling and/or similar mounting structure (12), such that, in a flush-mounted condition of the device (4) in the wall and/or ceiling and/or similar mounting structure (12), a space (72) is defined between the mounting structure (12) and the lip (71), the space (72) being configured to receive a plaster, in the case that it is necessary to plaster the wall and/or ceiling and/or similar mounting structure (12).

Figure 9:
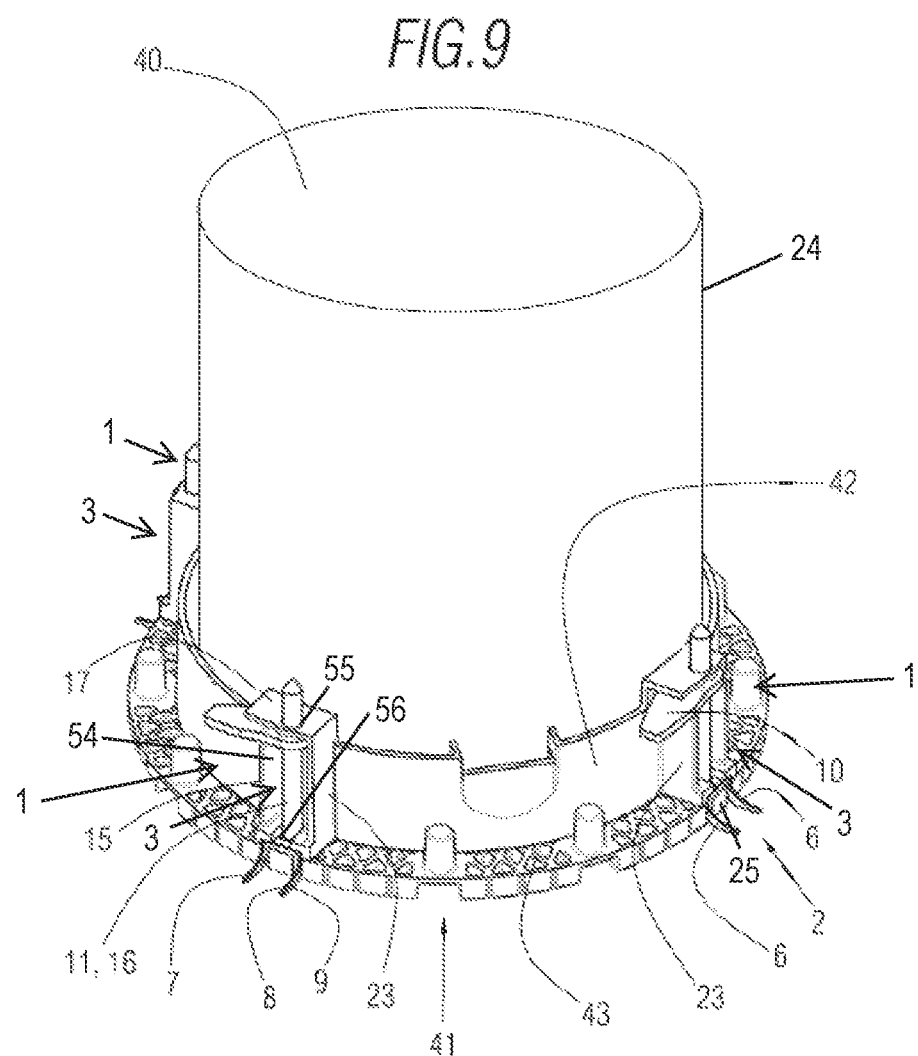
FIG. 9 shows a schematic view of a preferred embodiment of a flush-mountable device according to the invention.
Figure 10:
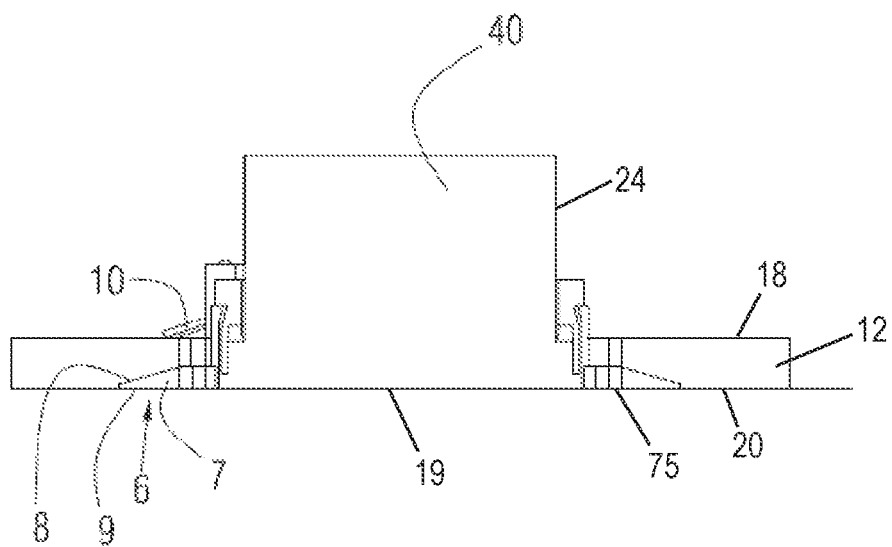
FIG. 10 shows a transverse cross section of a flush-mountable device according to the invention, flush mounted in a wall and/or ceiling and/or similar mounting structure.

FIGS. 9 and 10 show a flush-mountable device (40) according to the invention that has an element (5) connected to the device that is a frame (41).

The flush-mountable device (40) has a cylindrical shape.

The frame (41), preferably meshed, has a section (42) with a cylindrical ring shape and a perimeter edge (43) that projects outwards from the section (42). The section (42) defines a hole in which the flush-mountable device (40) is inserted.

The frame (41) is connected to the flush-mountable device (40) such that it is arranged in a side region of the flush-mountable device (40) in a position close to the visible face

(19) of the flush-mountable device (40) in a flush-mounted condition of the flush-mountable device (40) and the frame (41).

The gripping means (2) comprises two blades (6) joined to the perimeter edge (43) that have a laminar body (7) provided with an insertion edge (8) and a base (9), such that the base (9) is essentially coplanar with the plane defined by the perimeter of the visible face (19) of the device (40) in a flush-mounted condition of the frame (41) and the device (40) in the wall and/or ceiling and/or similar mounting structure (12).

The securing system (3) comprises a stop means (10) and guide means (11) that comprise an elongated shaft (16). The securing system (3) is joined to the frame (41) through a structure (15) with a rectangular vertical cross section joined to the ring section (42) and to the perimeter edge (43).

Specifically, the structure (15) comprises an upper cover (17), joined to a portion of the ring section (42) far from the visible face (75) of the frame (41) in a flush-mounted condition of the frame (41) in the wall and/or ceiling and/or similar mounting structure (12), and side walls (23), joined to a side surface of the ring section (42) and to the perimeter edge (43), this upper cover (17) and the side walls (23) defining a cavity (54) towards the outside of the ring section (42) such that within the cavity (54) are located the elongated shaft (16) and the stop means (10), which is a tab joined by means of a through join (79) to the elongated shaft (16) enabling the elongated shaft (16) to rotate about itself. The elongated shaft (16) is joined in a through manner by one of the ends thereof to the upper cover (17) and by the other to the perimeter edge (43), thus enabling the elongated shaft (16) to rotate about itself.

More specifically, the elongated shaft (16) passes through a hole (55) of the upper cover (17) and a hole (56) of the perimeter edge (43), this end that passes through the hole (56) of the perimeter edge (43) comprising a visible stop (78) that connects to the visible face (49) of the perimeter edge (43) of the frame (41) in a flush-mounted condition of the frame (41) in the wall and/or ceiling and/or similar mounting structure (12). This visible stop (78) has at least a notch that enables the elongated shaft (16) to rotate through an outside tool. Specifically, the perimeter edge (43) of the frame (41), around the hole (56) that the elongated shaft (16) passes through, has a receptacle in which the visible stop (78) fits such that it does not project beyond the plane that contains the visible face (49) of the perimeter edge (43) in a flush-mounted condition of the frame (41) and the mountable device (4) joined to the frame (41).

The gripping means (2) further comprises a base section (61) wherein the two blades (6) are arranged at the opposite ends of the base section (61) such that the blades (6) are joined to the base section (61) by an end opposite to that of the base (9) of the blade (6), the insertion edge (8) being a continuation of the base section (61) of the gripping means (2). In this embodiment, the base section (61) of the gripping means (2) comprises a hole (62) and is inserted in the perimeter edge (43) such that the hole thereof coincides with that of the perimeter edge (43) and the elongated shaft (16) therefore also passes through it.

The elongated shaft (16) comprises a threaded portion or surface (63) (shown in FIG. 4) and the stop means (10) comprises a hole (64) in the surface of which there is at least a notch. The elongated shaft (16) passes through the hole (64) of the stop means (10) such that it enables the relative movement of the stop means (10) along the elongated shaft (16) as the latter rotates about its own axis.

The stop means (10) is movable along at least one portion of the elongated shaft (16) such that, in a flush-mounted condition of the frame (41) in the wall and/or ceiling and/or similar mounting structure (12), the stop means (10) is arranged above or in contact with the non-visible face (18) of the wall and/or ceiling and/or similar mounting structure (12) and the blades (6) are embedded in the wall and/or ceiling and/or similar mounting structure (12). Preferably, the gripping means (2) and the securing system (3) are arranged on the frame (41) such that they are essentially aligned longitudinally.

As a result, the gripping means (2) and the securing system (3) are also connected to each other through the frame (41) and in a flush-mounted condition of the flush-mountable device (40) in the wall and/or ceiling and/or similar mounting structure (12) they are also connected through the wall and/or ceiling and/or similar mounting structure (12).

In order to flush mount the device (40) with the frame (41), the user must position the gripping means (2) in the vicinity of the hole (13) of the wall and/or ceiling and/or similar mounting structure (12) in order to then move the stop means (10) through the guide means (11) until the stop means (10) is arranged above or in contact with the non-visible face (18) of the wall and/or ceiling and/or similar mounting structure (12). While the stop means (10) is moved, the blades (6) of the gripping means (2) are embedded through the visible face (20) of the wall and/or ceiling and/or similar mounting structure (12) in the vicinity of the hole (13) of the same until they are completely embedded in the thickness of the wall and/or ceiling and/or similar mounting structure (12).

A person skilled in the art will be able to carry out modifications and variations based on the exemplary embodiments shown and described without departing from the scope of the invention as defined in the attached claims.

The invention claimed is:

1. A fastening system for flush mounting a mountable device in a mounting structure, comprising a wall or a ceiling, through a hole in the mounting structure, the fastening system comprising:
    gripping means insertable in a vicinity of a perimeter of the hole in the mounting structure, being configured to be connected to at least one of the mountable device or a connecting element configured to be connected to the mountable device by a first side region of the mountable device; and
    a securing system that comprises a stop means movable through guide means,
wherein the gripping means and the securing system are configured to be mechanically connected to the mountable device or the connecting element or both, the mountable device and the connecting element, such that, in a flush-mounted condition of the mountable device in the mounting structure, the stop means is arranged above or in contact with the non-visible face of the mounting structure, and wherein the gripping means comprises a blade that has a thin laminar body.

2. The fastening system according to claim 1, wherein the gripping means comprises a base section and the blade is one of at least two blades separated from each other and projecting from the base section, the blades being wedge-shaped.

3. The fastening system according to claim 1, wherein the guide means comprise an elongated shaft that has a threaded portion such that the elongated shaft may rotate with respect to an axis of the elongated shaft.

4. The fastening system according to claim 2, wherein the guide means comprise an elongated shaft to be received in a hole arranged in the base section of the gripping means.

5. The fastening system according to claim 1, wherein the gripping means is configured to be joined to the mountable device by a side region of the mountable device in a position close to a visible face of the mountable device in a flush-mounted condition of the mountable device in the mounting structure.

6. The fastening system according to claim 1, wherein the gripping means is configured to be joined to the connecting element by a first side region of the connecting element in a position close to a visible face of the connecting element in a flush-mounted condition of the mountable device in the mounting structure.

7. The fastening system according to claim 1, wherein the guide means comprise an elongated shaft that is configured to be joined to the mountable device by a second side region of the mountable device.

8. The fastening system according to claim 1, wherein the guide means comprise an elongated shaft that is configured to be joined to the connecting element configured to be connected to the mountable device by a side region of the connecting element.

9. A flush-mountable device envisaged to be flush mounted in a mounting structure comprising a wall or a ceiling through a hole in the mounting structure, comprising at least one fastening system that comprises:
   gripping means insertable in a vicinity of a hole of the mounting structure, being connected to at least one of the device or a connecting element connected to the device by a first side region of the device; and
   a securing system that comprises a stop means movable through guide means;
wherein the gripping means and the securing system are mechanically connected directly to the device or the connecting element or both, the device and the connecting element, such that, in a flush-mounted condition of the device in the mounting structure, the stop means is configured to be arranged above or in contact with a non-visible face of the mounting structure, and wherein the gripping means comprises a blade that has a thin laminar body.

10. The flush-mountable device according to claim 9, wherein the guide means comprises an elongated shaft that is configured to rotate about an axis of the elongated shaft such that, in a flush-mounted condition of the device in the mounting structure and the gripping means being positioned in a vicinity of the hole of the mounting structure, the elongated shaft rotates until the stop means is arranged above or is in contact with a non-visible face of the mounting structure and the gripping means is inserted in the vicinity of the hole of the mounting structure.

11. The flush-mountable device according to claim 9, wherein the gripping means projects from a side region of the device from a position close to a visible face of the device in a flush-mounted condition of the device.

12. The flush-mountable device according to claim 9, wherein the device comprises a meshed perimeter edge from which the gripping means projects from a position close to a visible face of the meshed perimeter edge in a flush-mounted condition of the device.

13. The flush-mountable device according to claim 9, wherein the connecting element is a frame arranged around at least one portion of the perimeter of the device such that a visible face of the frame in a flush-mounted condition of the frame in the mounting structure is sunken with respect to a visible face of the mounting structure, the gripping means projecting from a first side region of the frame in a position close to a visible face of the frame in a flush-mounted condition of the frame in the mounting structure.

14. The flush-mountable device according to claim 9, further comprising at least three fastening systems that are arranged essentially equidistant to each other.

* * * * *